United States Patent [19]

Suzuki et al.

[11] Patent Number: 5,198,051
[45] Date of Patent: Mar. 30, 1993

[54] RADIAL TIRE FOR MOTORCYCLE WITH TWO RUBBER LAYERS IN THE SIDEWALLS

[75] Inventors: Shigehiko Suzuki, Amagasaki; Itsuo Yasui, Nishinomiya; Sadaaki Naito, Kobe, all of Japan

[73] Assignee: Sumitomo Rubber Industries, Ltd., Kobe, Japan

[21] Appl. No.: 684,384

[22] Filed: Apr. 12, 1991

[30] Foreign Application Priority Data

Apr. 20, 1990 [JP] Japan .................. 2-106244

[51] Int. Cl.$^5$ .................. B60C 9/22; B60C 9/24; B60C 13/00; B60C 13/04
[52] U.S. Cl. .................. 152/524; 152/525; 152/531; 152/533; 152/546; 152/554
[58] Field of Search .................. 152/525, 524, 555, 531, 152/533, 209 WT, 543, 546, 539, 541, 547, 552, 554, 558, 560, 548, 530, 454

[56] References Cited

U.S. PATENT DOCUMENTS

| | | | |
|---|---|---|---|
| 3,052,275 | 9/1962 | Hylbert, Jr. ............... | 152/543 X |
| 4,019,551 | 4/1977 | Kolowski et al. ........... | 152/543 X |
| 4,773,462 | 9/1988 | Ohkuni et al. ............. | 152/546 X |
| 4,953,605 | 9/1990 | Kawamura et al. ......... | 152/543 X |

FOREIGN PATENT DOCUMENTS

| | | | |
|---|---|---|---|
| 2624442 | 6/1989 | France ............... | 152/555 |
| 57-105431 | 6/1982 | Japan ................ | 152/543 |
| 58-160805 | 10/1983 | Japan . | |
| 1-83410 | 3/1989 | Japan ................ | 152/555 |
| 1-278805 | 11/1989 | Japan ................ | 152/555 |
| 1487426 | 9/1977 | United Kingdom ... | 152/531 |

OTHER PUBLICATIONS

*Mechanics of Pneumatic Tires,* ed. Samuel Clark, U.S. Dept. of Transportation, Aug. 1981, p. 881.

*Primary Examiner*—Michael W. Ball
*Assistant Examiner*—Adrienne C. Johnstone

[57] ABSTRACT

A radial tire for motorcycles which comprises: at least one ply of radially arranged organic fiber cords turned up around the bead cores to form two turned up portions and a main portion therebetween; a tread disposed radially outside the carcass to define the tread portion; sidewalls disposed axially outside the carcass to define the sidewall portions; a belt disposed radially outside the carcass and inside the tread; a bead apex disposed between the carcass main portion and each carcass turned up portion and extending radially outwardly and taperingly from the bead core; the radial height of the radially outer edge of each carcass turned up portion being 0.3 to 0.5 times the radial height of the tread edge, both from the bead base; the radial height of the radially outer edge of each bead apex from the bead base being 0.3 to 0.5 times the radial height of the tread edge; the belt composed of at least one spirally wound cord having an elastic modulus of not less than 600 kgf/sq.mm, and formed by winding spirally a ribbon of rubber in which the at least one cord is embedded; and each sidewall composed of an axially inner hard rubber layer having a JIS A hardness of 65 to 75 and an axially outer soft rubber layer disposed on the axially outside of the inner layer and having a JIS A hardness of not more than 60.

1 Claim, 4 Drawing Sheets es,051

RADIAL TIRE FOR MOTORCYCLE WITH TWO RUBBER LAYERS IN THE SIDEWALLS

BACKGROUND OF THE INVENTION

The present invention relates to a motorcycle radial tire improved in high speed steering stability and high speed durability.

DESCRIPTION OF BACKGROUND ART

Recently, a radial ply carcass is used for motorcycle tires. Such a motorcycle radial tire has been made based on technique for four-wheeled vehicle tires, e.g. passenger car tires. That is, the tire has been provided with a belt reinforcement formed as follows: a rubberized fabric (d) is cut bias at a small angle (alpha) to the cord direction as shown in FIG. 8, which is usually 15 to 30 degrees; and the cut fabric (e) is wound around a carcass with connecting the ends (f) as shown in FIG. 7 to form an annular belt reinforcement (a), and accordingly, the laid angle of the belt cords (b) to the tire equator becomes the same bias angle (alpha). In such a bias belt structure, however, steering stability during straight running and cornering, especially at high speed, is not good.

On the other hand, Japanese Utility-Model Publication No. 58-160805 discloses a belt making method, in which a belt cord is wound spirally at a generally zero angle to the circumferential direction of the tire to form a jointless belt. When this is used in the motorcycle tire instead of the conventional belt, high speed steering stability is improved, but the stiffness of tire is decreased and bead durability is lost.

SUMMARY OF THE INVENTION

It is therefore, an object of the present invention to provide a motorcycle radial tire, in which straight running performance and cornering performance during high speed running are improved, and at the same time durability of the tread portion is improved.

According to one aspect of the present invention a radial tire for motorcycles having a maximum cross section width lying between tread edges, comprises:

a pair of bead cores disposed one in each bead portion of the tire;

a carcass extending between the bead portions through sidewall portions and a tread portion of the tire, the carcass having at least one ply of organic fiber cords arranged radially at an angle of 60 to 90 degrees to the tire equator and turned up around the bead cores to form two turned up portions and a main portion therebetween;

a tread disposed radially outside the carcass to define the tread portion;

sidewalls disposed axially outside the carcass to define the sidewall portions;

a belt disposed radially outside the carcass and inside the tread;

a bead apex disposed between the carcass main portion and each carcass turned up portion and extending radially outwardly and taperingly from the bead core;

the radial height of the radially outer edge of each carcass turned up portion being 0.3 to 0.5 times the radial height of the tread edge, both from the bead base;

the radial height of the radially outer edge of each bead apex from the bead base being 0.3 to 0.5 times said radial height of the tread edge;

said belt composed of at least one spirally wound cord having an elastic modulus of not less than 600 kgf/sq.mm, and formed by winding spirally a ribbon of rubber in which said at least one cord is embedded; and each sidewall composed of an axially inner hard rubber layer having a JIS A hardness of 65 to 75 and an axially outer soft rubber layer disposed on the axially outside of the inner layer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

An embodiment of the present invention will now be described in detail with reference to the accompanying drawings which are given by way of illustration only, and thus are not limitative of the present invention, and in which.

DETAILED DESCRIPTION OF THE PREFERRED EMBODIMENTS

Figure 1:
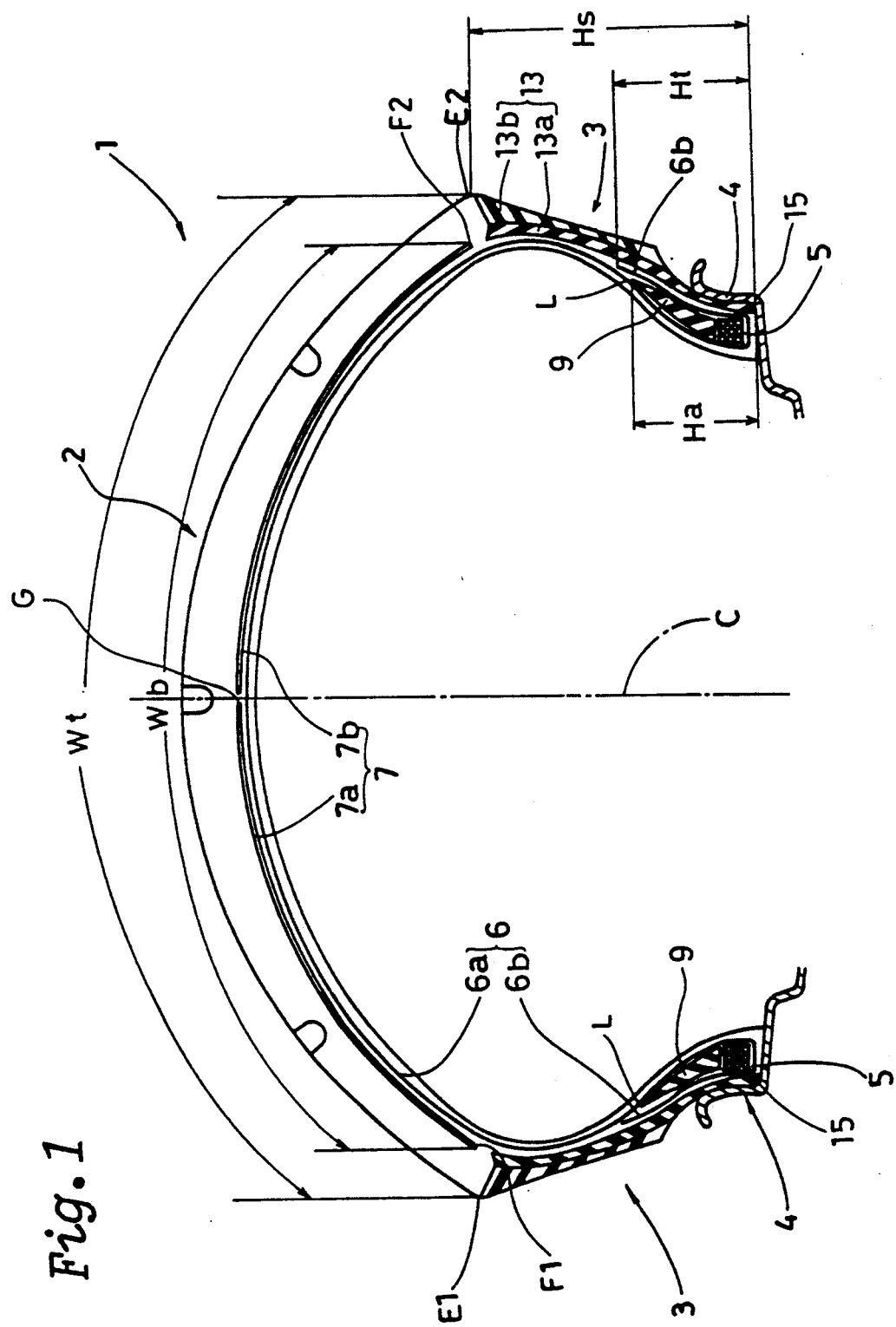
FIG. 1 is a sectional view showing an embodiment of the present invention.

In the figures, motorcycle tire 1 has a tread portion, a pair of bead portions 4, and a pair of sidewall portions 3 extending radially inwardly of the tire from the edges of the tread portion to the bead portions.

The tread portion is curved so that the maximum cross sectional width of the tire lies between the edges E1 and E2 of the tread, and the tread has a arched profile which is generally one third of a circle.

The tire 1 comprises:

a pair of bead cores 5 disposed one in each bead portion 4;

a carcass 6 extending between the bead portions 4 through the sidewall portions 3 and the tread portion 2, and having at least one ply of radially arranged cords turned up around the bead cores 5 from the axially inside to outside thereof to form two turned up portions 6b and a main portion 6a therebetween;

a tread 2 disposed radially outside the carcass to define the tread portion;

sidewalls 13 disposed axially outside the carcass to define the sidewall portions;

a belt 7 disposed radially outside the carcass 6 and inside the tread; and a bead apex 9 disposed between the carcass main portion 6a and each carcass turned up portion 6b and extending radially outwardly and taperingly from the bead core.

The carcass 6 has one ply of cords arranged radially at an angle of 60 to 90 degrees, preferably 70 to 90 degrees, with respect to the tire equator C.

For the carcass cords, organic fiber cords, e.g. nylon, rayon, polyester, aromatic polyamide and the like can be used.

Each turned up portion 6b is extended radially outwardly to a position in the sidewall portion, and the radial height Ht of the radially outer edge of the turned up portion is 0.3 to 0.5 times the radial height Hs of the tread edge, both measured from the bead base line 15. When the height Ht is less than 0.3 times the height Hs, the reinforcement becomes insufficient for the bead portion to endure bent deformation, and the durability is deteriorated. When the height Ht is more than 0.5 times the height Hs, the rigidity of the sidewall portion as well as the bead portion becomes excessively increased, and ride comfort is deteriorated.

The bead apex 9 is made of hard rubber having a JIS A hardness of not less than 60.

The radial height Ha of the radially outer edge L thereof from the bead base line 15 is 0.3 to 0.5 times the radial height Hs of the tread edge from the bead base line 15, and the height Ha is lower than the height Ht. When the height Ha is less than 0.3 times the height Hs, the rigidity of the bead portion against bending deformation is low, and the bead durability is decrease. When the height Ha is more than 0.5 times the height Hs, the rigidity of the sidewall portion is and the bead portion excessively increased, and ride comfort is deteriorated.

Each sidewall 13 is composed of two rubber layers: an axially inner sidewall 13a and an axially outer sidewall 13b, both extending from the tread edge to the bead portion.

The inner sidewall 13a is made of hard rubber having a JIS A hardness of 65 to 75 to reinforce the sidewall portion, but the outer sidewall 13b is made of softer rubber preferably having a JIS A hardness of not more than 60.

By setting the hardness of the outer sidewall to be not more than 60, cracks on the outer surface of the sidewall are prevented.

When the hardness of the inner sidewall is less than 65, the bending deformation of the sidewall becomes large, and a separation failure is apt to be caused at the carcass turned up edge. When the hardness is more than 75, ride comfort is impaired.

The inner hard rubber sidewall 13a is further extended to the bead base along the outside of the carcass main portion and turned up portion and terminated at the bead heel so as to form the axially outer face of the bead portion which comes into contact with a flange of its regular rim.

The radially inner edge of the outer sidewall 13b is however, terminated at a point radially outward of the radially outer edge of the rim flange.

The belt 7 is composed of at least one spirally wound cord, and the belt width Wb measured along the curved belt is 0.7 to 1.0 times the tread width Wt measured between the tread edges E1 and E2 along the tread face. When the width Wb is less than 0.7 times the tread width Wt, the rigidity of tread shoulder regions is decreased, and stability in quick turn is lost. When the width Wb is more than 1.0 times the tread width Wt, ride comfort is deteriorated by the excessively increased sidewall rigidity.

Figure 6:
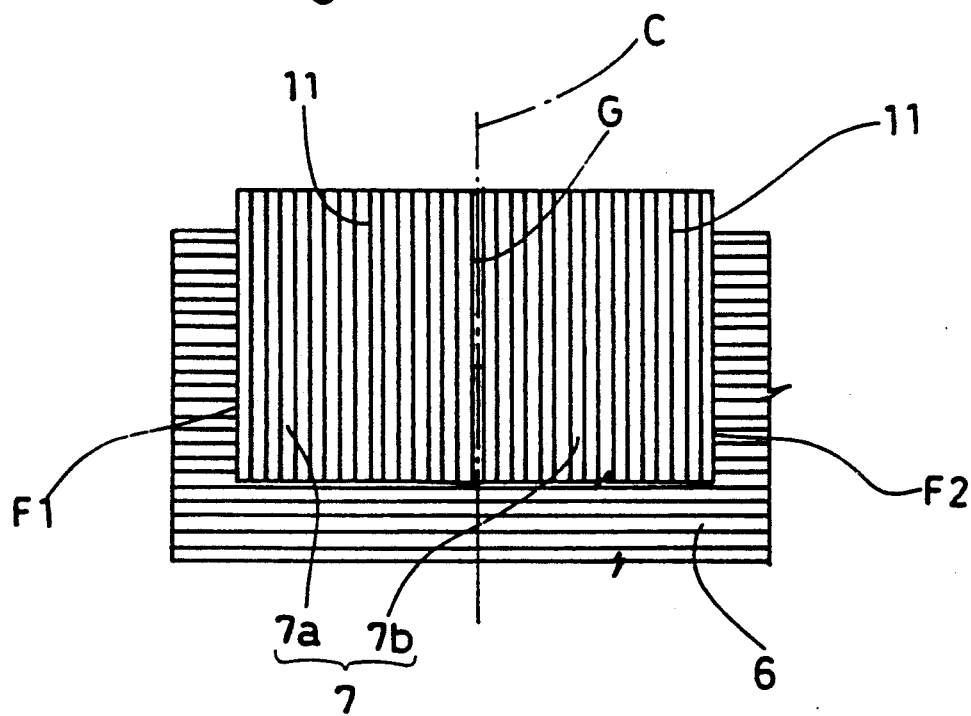
FIG. 6 is a developed plan view showing the arrangement of the carcass and belt.

In this embodiment, the belt 7 is composed of a two-piece ply 7 made up of a piece 7a and a piece 7b as shown in FIGS. 1 and 6. Each ply piece is extended from a portion near the tread edge E1, E2 to the tire equator, and in each ply piece at least one belt cord 11 is wound spirally and continuously from one edge to the other edge thereof at zero angle or a small angle with respect to the tire equator C.

For the belt cord 11, organic fiber cords, for example polyfluoroethylene (TEFLON), aromatic polyamide, polyester and the like, or steel cords, having a high modulus of elasticity of not less than 600 kgf/sq.mm, are used. When the elastic modulus is less than 600 kgf/sq.mm, the tread portion has an insufficient rigidity, and the directional stability and cornering performance at high speed and the durability are deteriorated.

Preferably, aromatic polyamide fiber cords having a high modulus of the same level as steel are used.

The belt 7 is formed by winding a ribbon 10 around the circumference of the carcass 6.

Figure 2:
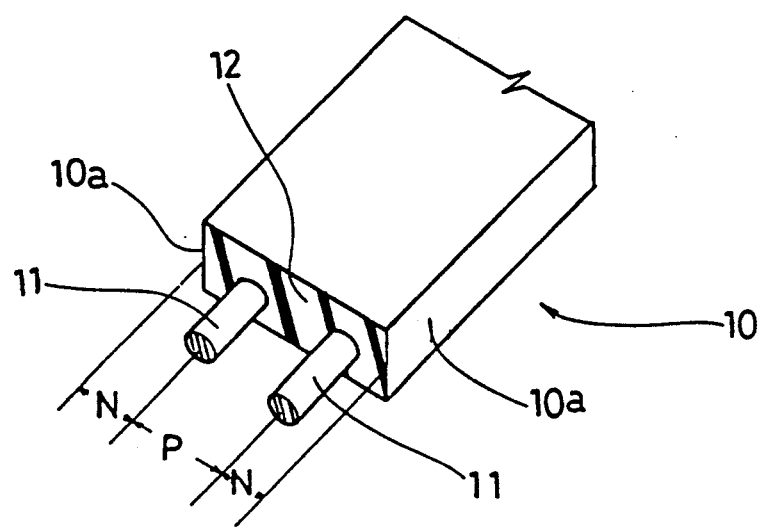
FIG. 2 is a perspective view showing a belt cord ribbon.

The ribbon 10 is, as shown in FIG. 2, a strip of rubber 12 in which a cord or a plurality of parallel cords, in this embodiment two parallel cords 11, are embedded.

In this embodiment, as shown in FIG. 2, the cross sectional shape of the ribbon 10 is a flat rectangle.

The distance N measured from the edge 10a of the ribbon to the center of the adjacent cord, that is, the outermost cord is set to be not more than ½ of the cord pitch P.

Figure 3:
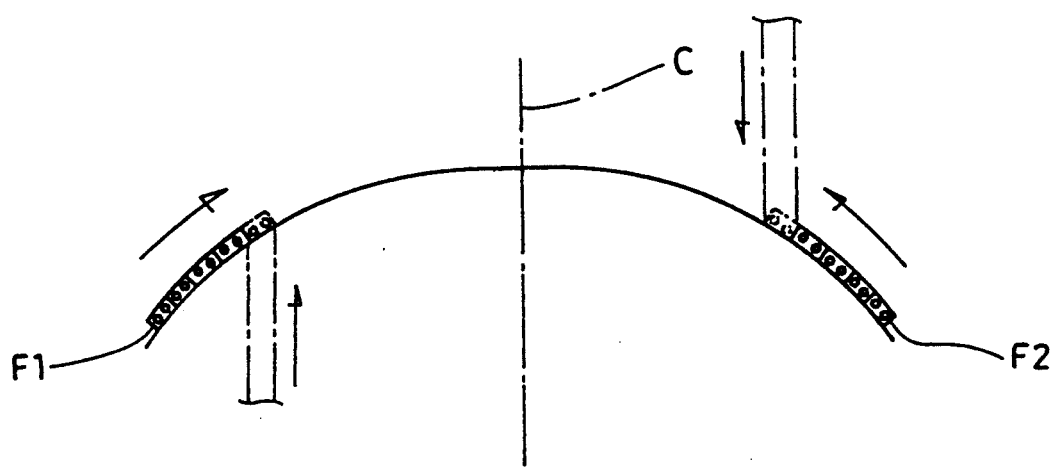
FIG. 3 is a sectional view showing winding of the ribbon.

In order to make the above-mentioned two-piece ply, as shown in FIG. 3, two ribbons 10 are simultaneously wound towards the tire equator C from the respective axially outer edges F1 and F2. As indicated by a chain line, the ribbons to be wound are supplied from two different or opposite directions. Therefore, the ribbon in the ply piece 7a and the ribbon in the ply piece 7b are inclined in the same direction at the same small angle to the tire equator.

Figure 5:
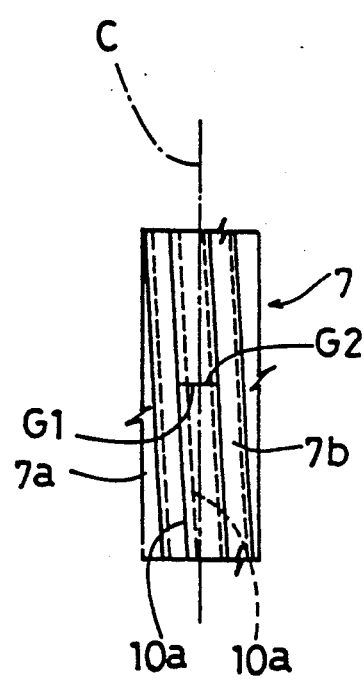
FIG. 5 is a plan view showing an example of termination of the ribbon.

Preferably, the terminal ends G1 and G2 of the ribbons of the ply piece 7a and 7b are butt jointed on the tire equator as shown in FIG. 5 and fixed by means of adhesive tape or adhesive agent.

Figure 4:
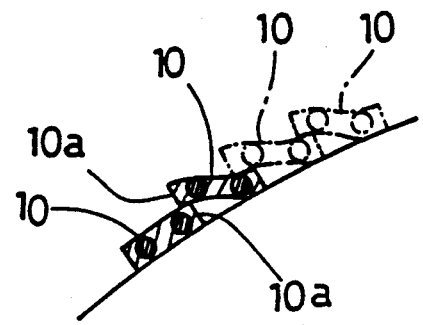
FIG. 4 is an enlarged view thereof.

When the ribbon 10 is being wound, the adjacent edges 10a are overlapped as shown in FIG. 4. Accordingly, the wound ribbon is prevented from being loosened, and as a result belt edge separation during running is prevented.

By winding in this way, the belt has an asymmetrical structure with respect to the tire equator, in which the winding direction of the cords in one belt ply piece is the same as that in the other piece.

However, the belt can have a symmetrical structure by supplying two ribbons from the same direction contrary to the FIG. 3. Thus, the winding direction of the cords in one belt ply piece is differed from that in the other piece.

Incidentally, in each of the pieces and/or between the pieces, the inclination of the cords can be changed. Further, the belt 7 can be formed by winding a ribbon 10 spirally around the carcass continuously from one edge to the other edge. If an axial gap of not more than the cord pitch P is formed between the axially inner edges of the ply pieces 7a and 7b, the gap can remain as it is. However, to reinforce the joint part, such a gap can be covered by a reinforcing strip disposed over the joint part.

Test tires of size 170/60VR17 including a working example tire and a reference tire having specifications given in Table 1 were made and tested for high speed cornering stability, high speed straight running stability and high speed durability.

Figure 7:
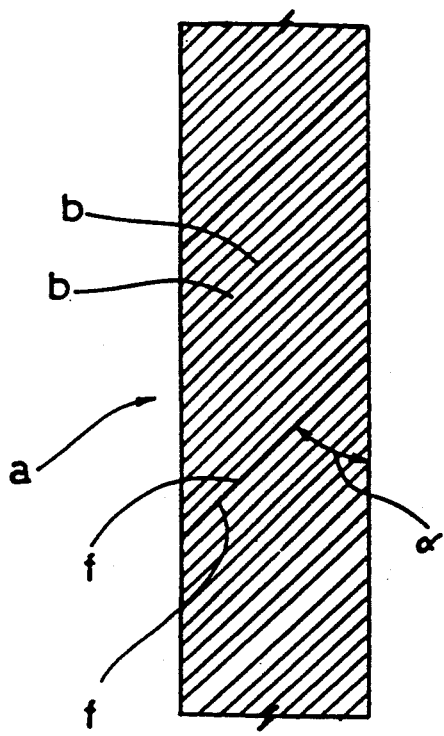
FIGS. 7 and 8 are plan views showing prior arts.
Figure 8:
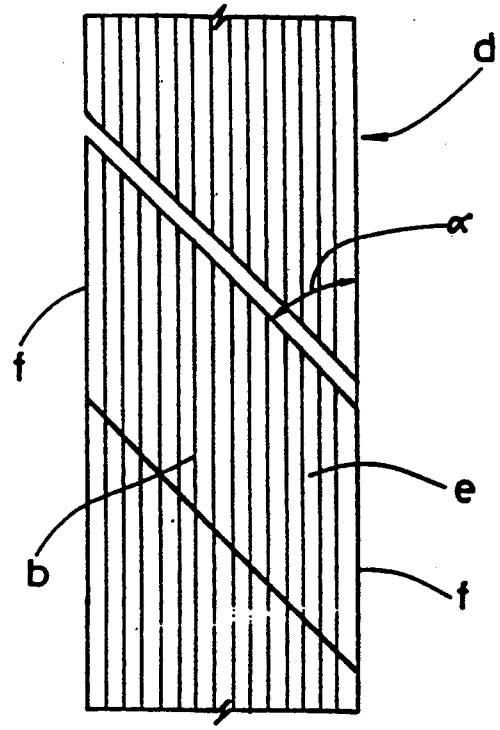

The working example tire had the construction shown in FIG. 1, and the reference tire had a conventional belt structure explained with FIGS. 7 and 8 and single-layer sidewalls.

The tests were as follows:

1) High speed straight running stability & High speed cornering stability

The test tire was installed on a motorcycle and run on a test road at 260 km/h (in a straight course) and 220 km/h (in a 400 m radius circular course). Then, using an index based on the assumption that the working example tire is 100, the stabilities were evaluated by rider's feeling. The larger the value, the better the performance.

2) High speed durability

The test tire mounted on its regular rim and inflated to 3.0 kgf/sq.cm and loaded with 355 kgf was run on a test drum, and the running speed was increased at a step of 10 km/h every 10 minutes from the initial speed of 250 km/h, and the total running time until any failure occurred in the tread portion was measured as its high speed durability. The durability is indicated by an index based on the assumption that the working example tire is 100. The larger the value, the better the performance.

As described above, in the motorcycle radial tire according to the present invention, the stability in high speed running and durability could be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| Carcass | | |
|---|---|---|
| Cord material | nylon 1260d/2 | nylon 1260d/2 |
| Cord angle (deg.) | 90 | 88 |
| Ht (mm) | 24 | 27 |
| Ht/Hs | 0.48 | 0.54 |
| Belt | | |
| Cord material | aramid 1500d/2 | nylon 1890d/2 |
| Cord angle (deg.) | 0 | 16 |
| Modulus (kgf/sq.mm) | 630 | 580 |
| Wb/Wt | 0.80 | 0.65 |
| Bead apex | | |
| Ha (mm) | 22 | 26 |
| Ha/Hs | 0.44 | 0.65 |
| Sidewall | 2 layers | 1 layer |
| JIS A hardness | 58 (outer) 72 (inner) | 58 |

TABLE 1-continued

| Test Result | | |
|---|---|---|
| Straight | 100 | 75 |
| Cornering | 100 | 80 |
| Durability | 100 | 75 |

We claim:

1. A radial tire and rim combination for motorcycles, the tire having a maximum cross section width lying between tread edges, comprises:

a pair of bead cores disposed one in each bead portion of the tire;

a carcass extending between the bead portions through sidewall portions and a tread portion of the tire, the carcass having at least one ply of organic fiber cords arranged radially at angle of 60 to 90 degrees to the tire equator and turned up around the bead cores to form two turned up portions and a main portion therebetween;

a tread disposed radially outside the carcass to define the tread portion;

sidewalls disposed axially outside the carcass to define the sidewall portions;

a belt disposed radially outside the carcass and inside the tread;

a bead apex disposed between the carcass main portion and each carcass turned up portion and extending radially outwardly and taperingly from the bead core;

the radial height of the radially outer edge of each carcass turned up portion being 0.3 to 0.5 times the radial height of the tread edge, both from the bead base;

the radial height of the radially outer edge of each bead apex from the bead base being 0.3 to 0.5 times said radial height of the tread edge;

said belt composed of at least one spirally wound cord having an elastic modulus of not less than 600 kgf/sq.mm, and formed by winding spirally a ribbon of rubber in which said at least one cord is embedded; and each sidewall composed of an axially inner hard rubber layer having a JIS A hardness of 65 to 75 and an axially outer soft rubber layer disposed on the axially outside of the inner layer, the axially outer soft rubber layer having a JIS A hardness of not more than 60 and the axially inner hard rubber layer being extended from the tread edge to the bead base along the axially outer side of the carcass, and the axially outer soft rubber layer being extended from the tread edge to a position radially outward of the radially outer edge of a flange of its regular rim.

* * * * *